US006817631B1

United States Patent
Gavin (10) Patent No.: US 6,817,631 B1
(45) Date of Patent: Nov. 16, 2004

(54) SEPTIC SYSTEM BOX PIPE SEAL

(76) Inventor: Norman W. Gavin, 173 Church St., Yalesville, CT (US) 06492

( * ) Notice: Subject to any disclaimer, the term of this patent is extended or adjusted under 35 U.S.C. 154(b) by 0 days.

(21) Appl. No.: 10/677,711

(22) Filed: Oct. 2, 2003

Related U.S. Application Data (60) Provisional application No. 60/431,390, filed on Dec. 7, 2002.

(51) Int. Cl.[7] .............................. F16J 15/10; F16L 17/06
(52) U.S. Cl. ....................... 285/139.1; 285/3; 285/423; 285/328; 277/606; 277/277
(58) Field of Search ........................... 285/139.1, 139.2, 285/205, 3, 4, 423, 328; 277/606, 277

(56) References Cited

U.S. PATENT DOCUMENTS

| 985,853 A | * | 3/1911 | Stewart .................... 285/139.1 |
| 1,003,179 A | * | 9/1911 | Gruschow .................... 251/261 |
| 1,592,454 A | * | 7/1926 | Frederickson .................. 285/4 |
| 2,344,056 A | * | 3/1944 | Pepersack .................... 285/19 |
| 3,195,932 A | | 7/1965 | Morton |
| 3,531,142 A | | 9/1970 | Peasley |
| 3,654,965 A | * | 4/1972 | Gramain ...................... 138/89 |
| 3,749,424 A | | 7/1973 | Greene |
| 3,812,910 A | * | 5/1974 | Wellstein .................... 166/85.2 |
| 4,140,337 A | * | 2/1979 | Arcella et al. ................. 285/3 |
| 4,234,218 A | | 11/1980 | Rogers |
| 4,332,393 A | | 6/1982 | Cuschera |
| 4,479,667 A | * | 10/1984 | Major et al. .................. 285/39 |
| 4,613,169 A | | 9/1986 | Engelhart |
| 4,663,036 A | * | 5/1987 | Strobl et al. .................. 405/52 |
| 4,732,397 A | * | 3/1988 | Gavin ........................ 277/606 |
| 4,805,920 A | | 2/1989 | Gavin |
| 5,129,684 A | | 7/1992 | Lawrence et al. |
| 5,286,040 A | * | 2/1994 | Gavin ........................ 277/606 |
| 5,456,499 A | | 10/1995 | Sharpe |
| 5,624,123 A | * | 4/1997 | Meyers ....................... 277/604 |
| 5,655,564 A | * | 8/1997 | Gavin ........................ 137/363 |
| 5,711,536 A | * | 1/1998 | Meyers ....................... 277/606 |
| 5,882,014 A | | 3/1999 | Gavin |
| 5,967,567 A | | 10/1999 | Nordstrom |
| 5,971,444 A | | 10/1999 | Hawkins |
| 6,192,526 B1 | * | 2/2001 | Nichols-Roy et al. .......... 4/378 |
| 6,386,550 B1 | * | 5/2002 | Mokrzycki et al. ......... 277/616 |
| 6,609,718 B1 | * | 8/2003 | Gavin ........................ 277/606 |
| 6,739,597 B2 | * | 5/2004 | Nicolia et al. .............. 277/609 |

* cited by examiner

*Primary Examiner*—Eric K. Nicholson
(74) *Attorney, Agent, or Firm*—Robert A. Seemann (57) ABSTRACT

A seal plate includes tear out sections that leave pipe sealing openings, an externally threaded cylindrical portion that extends through a hole in a septic system distribution box wall, a resilient cup-shaped flange that faces one side of the wall around the hole, an internally threaded ring with hand grips that is screwed onto the cylindrical portion against the other side of the wall so that the wall is clamped between the ring and the cup-shaped flange and the flange bends axially, resiliently forcing concentric radially spaced axially extending ridges on the cup shape flange sealingly against the wall.

5 Claims, 7 Drawing Sheets

SEPTIC SYSTEM BOX PIPE SEAL

This application claims the benefit of U.S. Provisional Application No. 60/431,390, filed Dec. 7, 2002.

BACKGROUND OF THE INVENTION

1. Field of the Invention

The invention pertains to pipe seals for septic system liquid distribution boxes or drop boxes, more particularly to a field-installable and removable pipe seal for a plastic drop box.

2. Description of the Prior Art

Septic system box seals for receiving septic system pipes through a wall of the box are mounted sealingly to the wall in a hole through the wall.

One method for mounting the seal sealingly to the wall comprises casting an annular radially extending ring about the seal into the wall of the box around the hole.

Another method for mounting the seal sealingly to the wall comprises fusing an annular radially extending portion of the seal to the wall after the wall and hole in the wall is formed.

SUMMARY OF THE INVENTION

It is one object of the invention to provide a seal that is adjustable for receiving different diameter septic system pipes by tearing out a portion of the seal, the seal otherwise sealing a hole through a wall of a septic system drop box in which the seal is mounted.

It is another object of the invention that the seal resiliently double seals on one side of the wall through which the seal extends.

It is another object of the invention that the seal is mounted in the hole in the wall by screwing a ring on a cylindrical portion of the seal that extends through the wall.

It is another object that the seal can be field installed in a hole in a drop box wall by hand.

BRIEF DESCRIPTION OF THE DRAWINGS

In order that the invention be more fully comprehended, it will now be described, by way of example, with reference to the accompanying drawings, in which.

A septic system fluid distribution box seal assembly includes a fluid distribution box comprising a first wall having a first side and a second side, a first opening through the first wall for receiving a septic system pipe through the first opening, a one piece flexible plastic plate comprising tear out means for receiving a pipe through the plate sealingly around the pipe, a cylindrical outside threaded portion of the plate extending through the first opening, a flange portion of the plate extending radially from the plate comprising a first annular axially facing surface facing the first side, a ring comprising a second annular radially extending axially facing surface and an internal thread, screwed onto the external thread of the cylindrical portion so that the second annular surface faces the second side, a first annular axially extending ridge on the first annular surface radially spaced from a second annular axially extending ridge on the first annular surface, the flange being resilient and angled toward the ring so that the flange is bent axially away from the external threads by the front of the wall when the ring is screwed toward the flange clamping the first wall between the ring and the first and second ridges.

DESCRIPTION OF THE PREFERRED EMBODIMENTS

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

U.S. Provisional Application No. 60/431,390, filed Dec. 07, 2002 is hereby incorporated by reference in its entirety.

Referring to the drawings, seal 30 is mounted on wall 34 of drop box 38. Threads 40 have a smaller outer diameter 42 than inner diameter 44 of opening 50 through wall 34.

Ring 54 is screwed by threads 60 onto threads 40 of plate 58 until wall 34 is sealingly, clamped between radially extending annular surface 62 of the ring and radially extending annular flange 64 of plate 58. Preferably surface 62 bears on the outer face 66 of wall 34 and flange 64 bears on inner face 68 of wall 34.

Preferably surface 62 is perpendicular 72 to axis 76 of seal 30.

Annular surface 80 angles toward surface 62 as surface 80 extends away from axis 76 so that portion 82 is closer to surface 62 than portion, 84 when ring 54 is screwed on plate 58 before ring 54 is screwed on tightly to sealingly tighten the seal on wall 34.

Portion 82 includes radially spaced apart 88 annular axially extending ridges 92 and 94. Ridge 92, being distal from ridge 94 compared to axis 76.

Preferably the height of ridge 92 is the same as ridge 94 so that ridge 92, is closer to surface 62 than ridge 94.

Figure 1:
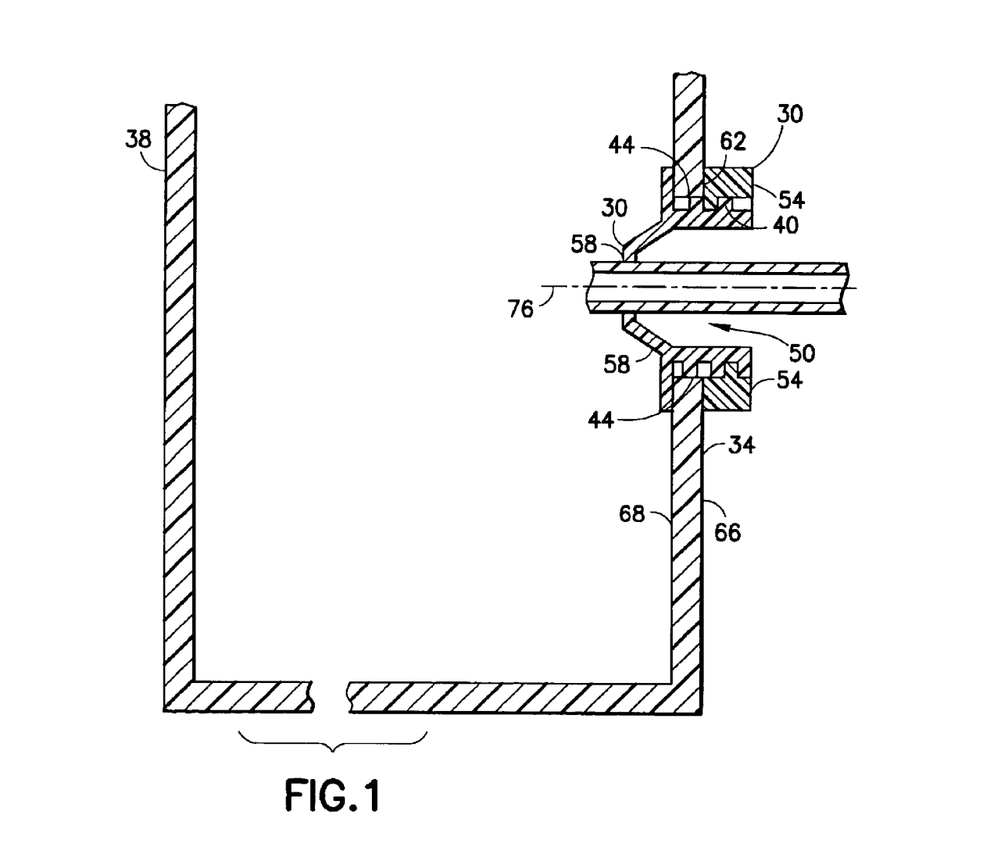
FIG. 1 is a schematic cross section side view of a septic system plastic drop box including a septic system distribution pipe extending sealingly through a seal removably mounted sealingly in a hole through a wall of the box, according to the invention.
Figures 2, 3:
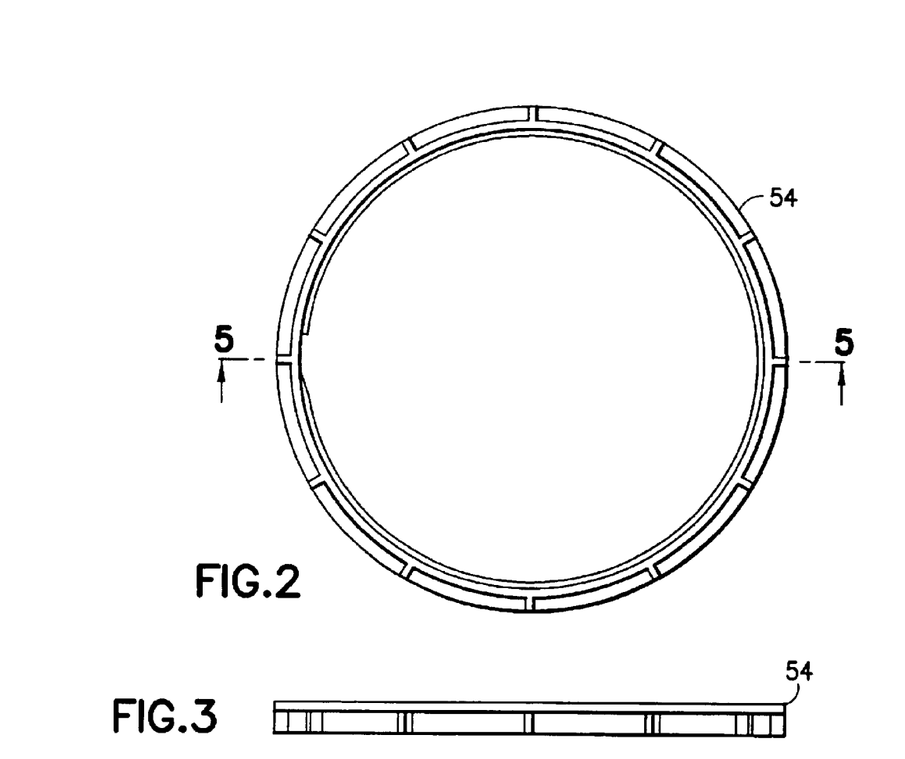
FIG. 2 is a front view of a threaded ring of the invention.
FIG. 3 is a side view, front facing down, of the threaded ring of FIG. 2
Figure 4:
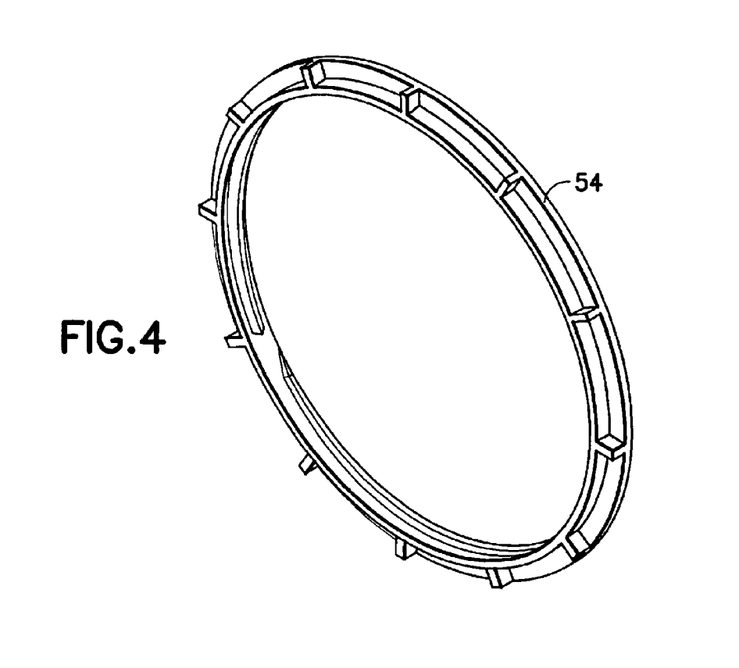
FIG. 4 is a front perspective view of the threaded ring of FIG. 2.
Figure 5:
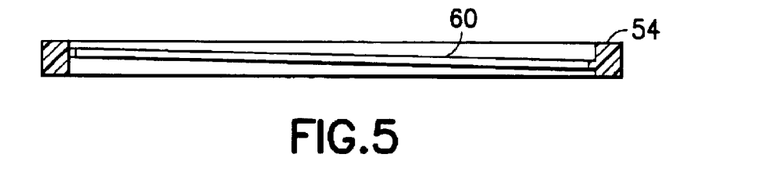
FIG. 5 is a cross section side view of the threaded ring of FIG. 2 taken along 5—5.
Figure 6:
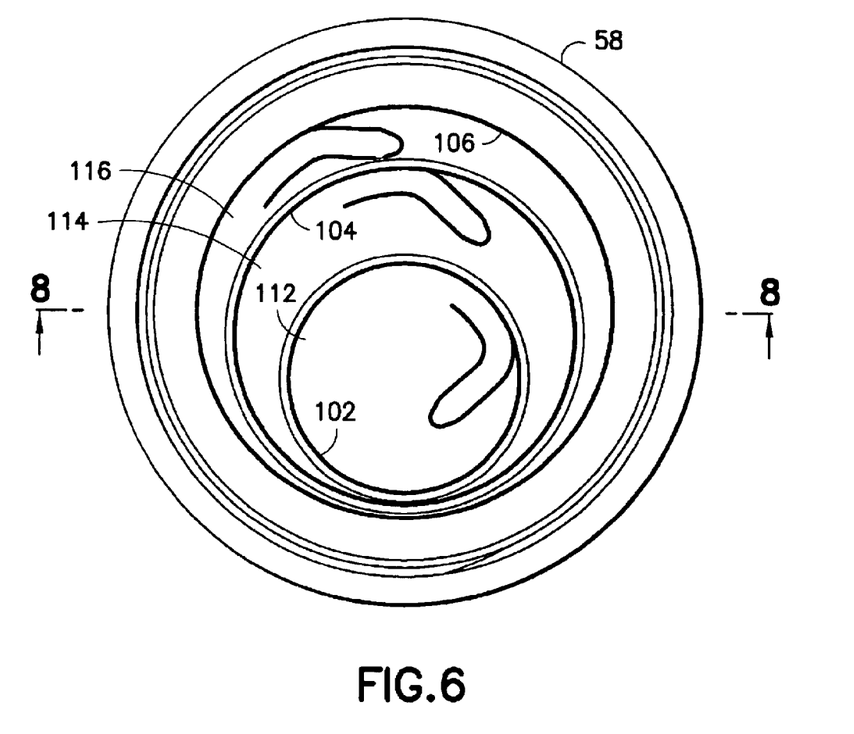
FIG. 6 is a front view of a seal plate of the invention.
Figure 7:
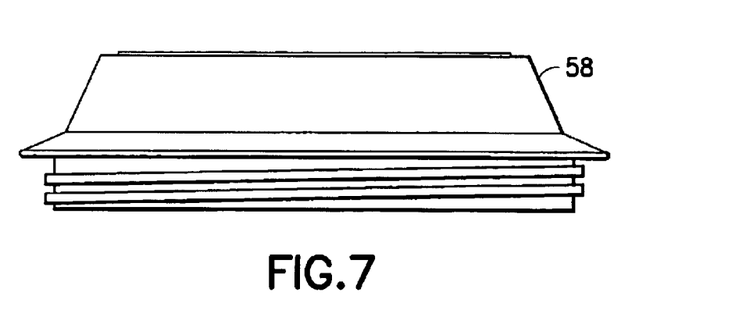
FIG. 7 is a side view, front facing down, of the plate of FIG. 6.
Figure 8:
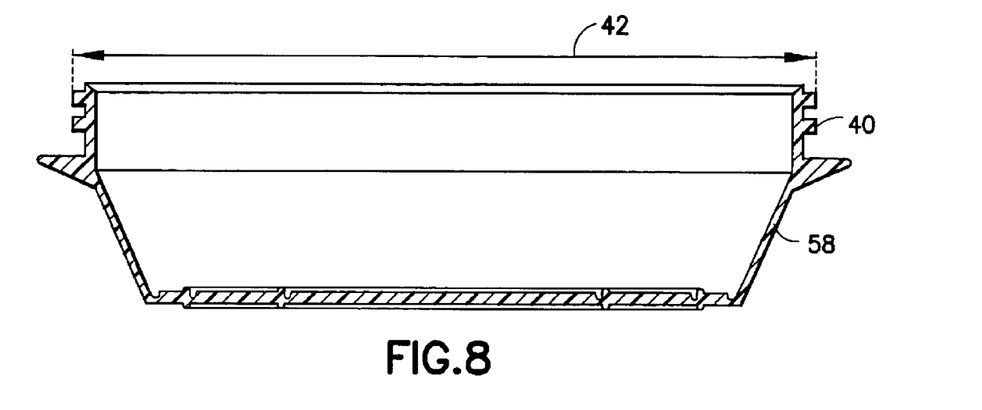
FIG. 8 is a cross section side view of the plate of FIG. 6 taken along 8—8.
Figure 9:
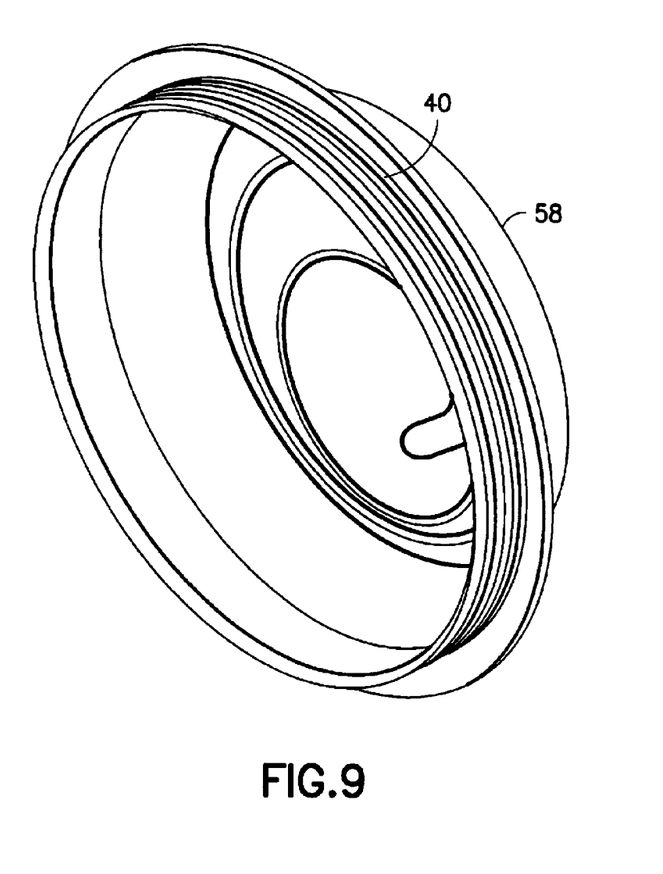
FIG. 9 is a perspective front view of the plate of FIG. 6.
Figure 10:
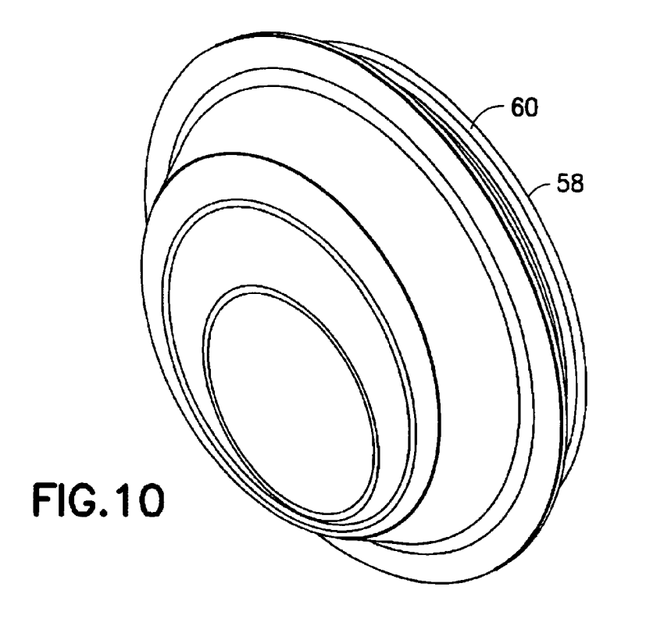
FIG. 10 is a back perspective view of the plate of FIG. 6.
Figure 11:
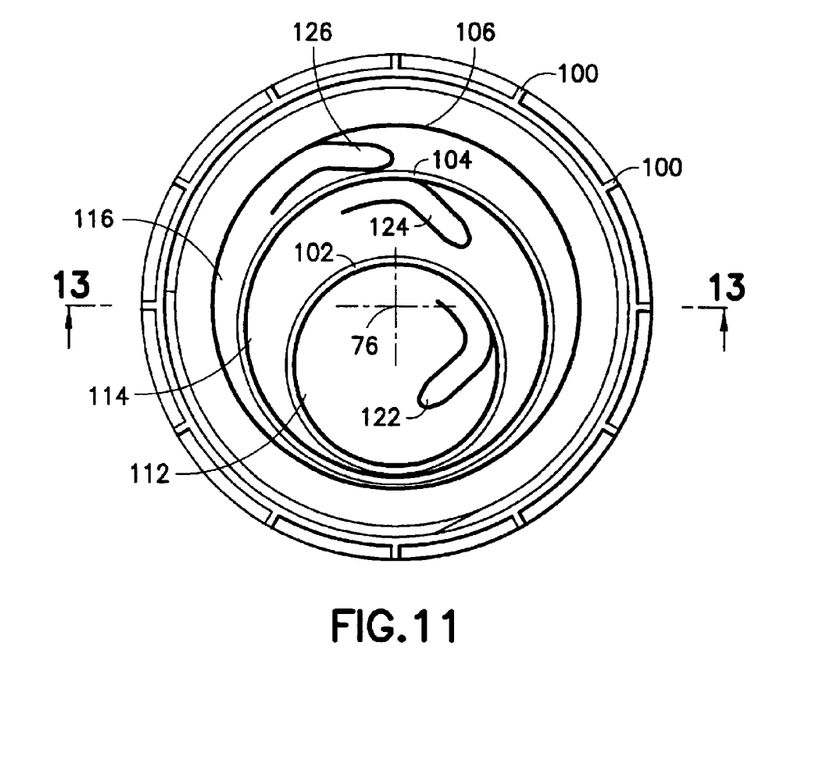
FIG. 11 is a front view of the threaded ring of FIG. 2, screwed onto the seal plate of FIG. 6.
Figure 12:
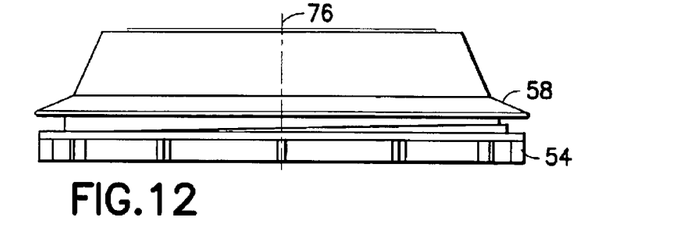
FIG. 12 is a side view, front facing down, of the ring and plate of FIG. 11.
Figure 13:
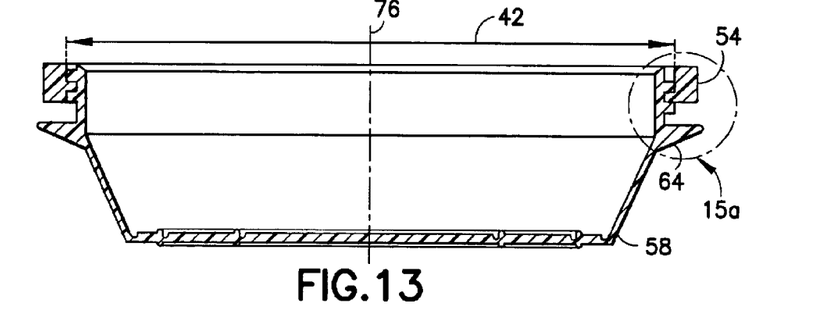
FIG. 13 is a cross section side view of the ring and plate of FIG. 11 taken along 13—13.
Figure 14:
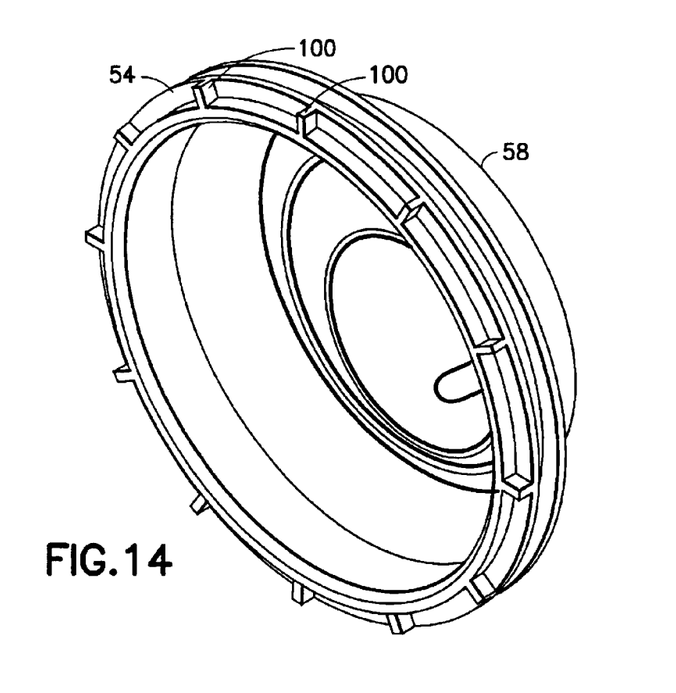
FIG. 14 is a front perspective view of the ring and plate of FIG. 11.
Figure 15:
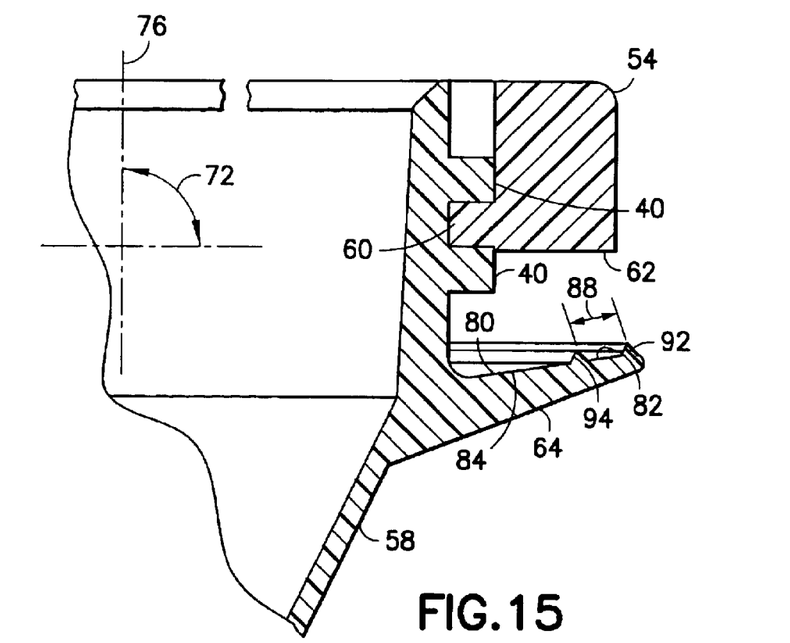
FIG. 15 is a cross section enlarged partial view of the ring and plate of FIG. 11 taken at 15a, as shown in FIG. 13.
Figure 16:
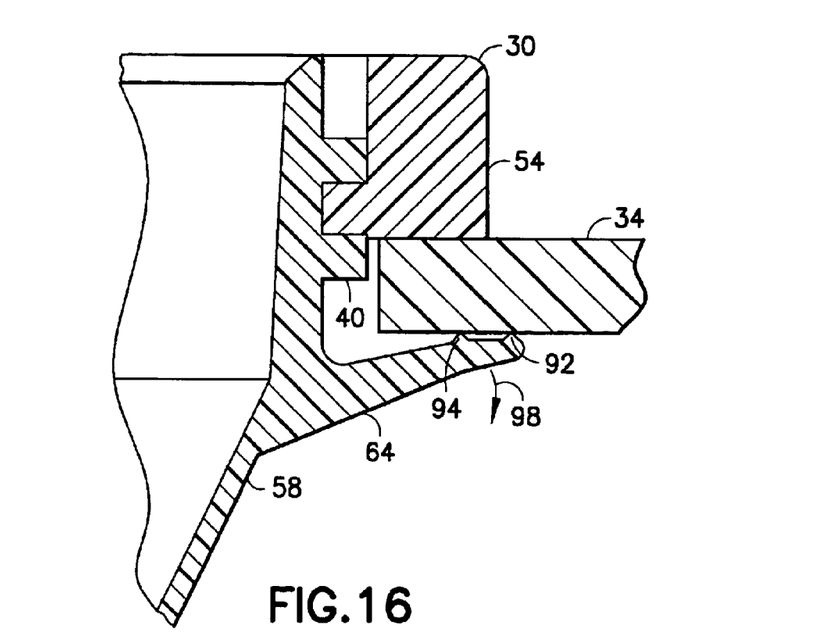
FIG. 16 is a cross section enlarged partial view of the ring and plate of FIG. 11 tightened on a wall of a drop box.

In FIG. 16, seal 30 is sealingly mounted on wall 34. Ring 54 is screwed onto plate 58, clamping wall 34 between surfaces 62 and 80. Ring 54 is screwed toward flange 64 far enough so that flange 64 bends 98, bringing each of annular ridges 92 and 94 into liquid tight sealing contact with wall 34.

Ring 54 is preferably made of a rigid material, preferably one piece, plastic.

Plate 58 is preferably molded in one piece, made of a plastic, flexible enough so that flange 64 can bend as described above to seal ridges 94 and 92 against a wall of a septic tank plastic drop box. Plastic drop boxes used in septic systems are generally made of a tough plastic that is rigid so that the boxes can withstand the crushing force of earth in which they are buried.

Hand grip ridges 100 on ring 54 provide sufficient grip for hand tightening of the ring enough to bring ridges 92 and 94 into contact with wall 34. This combination of hand-grip ridges, plurality of ridges 92 and 94 and axially flexible axially angled flange that springs axially, urging first the primary sealing ridge 92, and then the secondary sealing ridge 94 against the wall as the ring is tightened makes the seal water tight, easy to install sealingly on the drop box in the field when a septic system is being installed, and easy to remove in the field.

Although the above same size ridges and contact order is preferred, the ridges may be of different heights so that they contact the wall simultaneously or in opposite order.

Weakened annular narrow rings 102, 104 and 106 circumscribe portions 112, 114, and 116 respectively of plate 58 that can be torn out of the plate to leave openings for receiving septic system pipe of different diameters. In order to prevent damage to the inner diameter pipe-sealing edge of an opening that is left by tearing out a portion 112, 114, or 116 by starting with a penetrating tool in the weakened annular ring, a divergent portion 122, 124, or 126 is pushed out of the disc by any convenient tool and then pulled in the manner of a tab to tear out the annular section. Tearing out of weakened annular rings is described in Norman W. Gavin's U.S. Pat. Nos. 4,805,920 patented Feb. 21, 89 and 5,882,014 patented Mar. 16, 1999.

A seal made according to the invention was tightened in an opening through a drop box and tested for leakage. No liquid leakage occurred between the seal and the drop box wall. The drop box was made of HDPE (high density polyethylene). The seal ring was made of LLDPE (linear low density polyethylene). The seal plate was made of polypropylene.

Other materials may be used so long as flexibility of the angled flange is provided.

Although the invention has been described in terms of specific preferred embodiments, it will be obvious to one skilled in the art that various modifications and substitutions are contemplated by the invention disclosed herein and that all such modifications and substitutions are included within the scope of the invention as defined in the appended claims.

Drawing Designators (Informal List)

30 seal
34 wall
38 drop box
40 threads
42 outer diameter
44 inner diameter
50 opening
54 ring
58 plate
60 threads
62 annular surface
64 annular flange
66 outer face of wall 34
68 inner face of wall 34
72 perpendicular
76 axis
80 annular surface
82 portion
84 portion
88 spaced apart
92 ridge
94 ridge
98 bends
100 ridges, hand grip
102 weakened narrow annular ring
104 weakened narrow annular ring
106 weakened narrow annular ring
112 portion
114 portion
116 portion
122 divergent portion
124 divergent portion
126 divergent portion

What is claimed is:

1. A septic system fluid distribution box seal assembly comprising:

a fluid distribution box comprising a first wall having a first side and a second side, a first opening through said first wall for receiving a septic system pipe through said first opening, a one piece plastic plate comprising tear out means for receiving a pipe through said plate sealingly around the pipe, a cylindrical outside threaded portion of said plate extending through said first opening, a flange portion of said plate extending radially from said plate comprising a first annular axially facing surface facing said first side, a ring comprising a second annular radially extending axially facing surface and an internal thread, screwed onto the external thread of said cylindrical portion so that said second annular surface faces said second side, a first annular axially extending ridge on said first annular surface radially spaced from a second annular axially extending ridge on said first annular surface, said flange being resilient and angled toward said ring so that said flange is bent axially away from said external threads when said ring is screwed toward said flange clamping said first wall between said ring and the first and second ridges.

2. A septic system fluid distribution box seal assembly comprising:

a fluid distribution box comprising a first wall having a first side and a second side, a first opening through said first wall for receiving a septic system pipe through said first opening, a one piece flexible plastic plate comprising tear out means for receiving a pipe through said plate sealingly around the pipe, a cylindrical outside threaded portion of said plate extending through said first opening, a flange portion of said plate extending radially from said plate comprising a first annular axially facing surface facing said first side, a one piece rigid plastic ring comprising a second annular radially extending axially facing surface and an internal thread, screwed onto the external thread of said cylindrical portion so that said second annular surface faces said second side, a first annular axially extending ridge on said first annular surface radially spaced from a second annular axially extending ridge on said first annular surface, said flange being resilient and angled toward said ring so that said flange is bent axially away from said external threads when said ring is screwed toward said flange clamping said first wall between said ring and the first and second ridges.

3. A septic system fluid distribution box seal assembly comprising:

a fluid distribution box comprising a first wall having a first side and a second side, a first opening through said first wall for receiving a septic system pipe through said first opening, a one piece plastic plate comprising a frustoconical wall having a first sealed end comprising tear out means for receiving a pipe through said plate sealingly around the pipe, a cylindrical outside threaded portion of said plate extending through said first opening, a flange portion of said plate extending radially from said plate comprising a first annular axially facing surface facing said first side, a one piece ridged ring comprising a second annular radially extending axially facing surface and an internal thread, screwed onto the external thread of said cylindrical portion so that said second annular surface faces said second side, a first annular axially extending ridge on said first annular surface, said flange being resilient and angled toward said ring so that said flange is bent axially away from said external threads when said ring is screwed toward said flange clamping said first wall between said ring and said first annular axially extending ridge.

4. The septic system fluid distribution box seal assembly of claim 1 further including a plurality of grip ridges, each grip ridge of said plurality of grip ridges extending axially and radially from said ring.

5. The septic system fluid distribution box seal assembly of claim 2 further including a plurality of grip ridges, each grip ridge of said plurality of grip ridges extending axially and radially from said ring.

* * * * *